(12) United States Patent
Jump et al.

(10) Patent No.: US 12,199,848 B2
(45) Date of Patent: Jan. 14, 2025

(54) IDENTIFYING NETWORK COMMUNICATION PERFORMANCE OUTLIER ENDPOINTS IN A COMPUTER NETWORK

(71) Applicant: UNITED STATES POSTAL SERVICE, Washington, DC (US)

(72) Inventors: Theodore A. Jump, Raleigh, NC (US); Jennifer S. Mulherin, Morrisville, NC (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 70 days.

(21) Appl. No.: 17/125,472

(22) Filed: Dec. 17, 2020

(65) Prior Publication Data

US 2021/0194782 A1 Jun. 24, 2021

Related U.S. Application Data

(60) Provisional application No. 62/949,508, filed on Dec. 18, 2019.

(51) Int. Cl.
*H04L 12/26* (2006.01)
*H04L 41/12* (2022.01)
(Continued)

(52) U.S. Cl.
CPC .......... *H04L 43/0811* (2013.01); *H04L 41/12* (2013.01); *H04L 43/0864* (2013.01);
(Continued)

(58) Field of Classification Search
CPC . H04L 43/0811; H04L 41/12; H04L 43/0864; H04L 43/087; H04L 43/0888; H04L 43/50; H04L 43/04; H04L 43/10
See application file for complete search history.

(56) References Cited

U.S. PATENT DOCUMENTS 8,713,138 B1 * 4/2014 Machiraju ............... H04L 43/10
709/221
2006/0234639 A1 * 10/2006 Kushwaha ............ H04W 24/00
455/67.11

(Continued)

*Primary Examiner* — Brian J. Gillis
*Assistant Examiner* — Juan C Turriate Gastulo
(74) *Attorney, Agent, or Firm* — MH2 Technology Law Group, LLP

(57) ABSTRACT

A computer-implemented method includes selecting, by a host endpoint device within a subnet, a test endpoint device, of a plurality of test endpoint devices within the subnet, with which to perform a connectivity performance quality test; determining, by the host endpoint device, a payload size for a test file to be used for performing a network throughput test as part of the connectivity performance quality test; performing, by the host endpoint device, the connectivity performance quality test with the test endpoint device, wherein performing the connectivity performance quality test comprises performing a plurality of network throughput tests using the test file having the payload size that was determined; and providing, by the host endpoint device, results data from the connectivity performance quality test to a central network administration device, whereby the central network administration device executes a computer-based instruction based on the results data from the connectivity performance quality test.

20 Claims, 4 Drawing Sheets

(51) Int. Cl.
*H04L 43/0811* (2022.01)
*H04L 43/0864* (2022.01)
*H04L 43/087* (2022.01)
*H04L 43/0888* (2022.01)
*H04L 43/50* (2022.01)

(52) U.S. Cl.
CPC ........ *H04L 43/087* (2013.01); *H04L 43/0888* (2013.01); *H04L 43/50* (2013.01)

(56) References Cited

U.S. PATENT DOCUMENTS

| | | | | |
|---|---|---|---|---|
| 2008/0165727 | A1* | 7/2008 | Xiaoben | H04W 16/06 370/329 |
| 2010/0046396 | A1* | 2/2010 | Cai | H04W 24/02 370/254 |
| 2013/0121337 | A1* | 5/2013 | Nguyen | H04L 45/70 370/410 |
| 2013/0136030 | A1* | 5/2013 | Xiao | H04L 43/0888 370/253 |
| 2015/0024720 | A1* | 1/2015 | Efrati | H04W 12/02 455/414.1 |
| 2015/0289176 | A1* | 10/2015 | Liu | H04W 24/02 370/331 |
| 2016/0183110 | A1* | 6/2016 | Boyd | H04W 24/10 370/252 |
| 2017/0373984 | A1* | 12/2017 | Sarapure | H04L 43/0894 |
| 2020/0021493 | A1* | 1/2020 | Karacali-Akyamac | H04L 43/087 |
| 2020/0092184 | A1* | 3/2020 | Park | H04L 41/0806 |
| 2020/0304397 | A1* | 9/2020 | Smith | H04L 43/0817 |
| 2021/0105186 | A1* | 4/2021 | Reale | H04L 43/0811 |
| 2022/0027431 | A1* | 1/2022 | Zheng | H04L 67/125 |

* cited by examiner

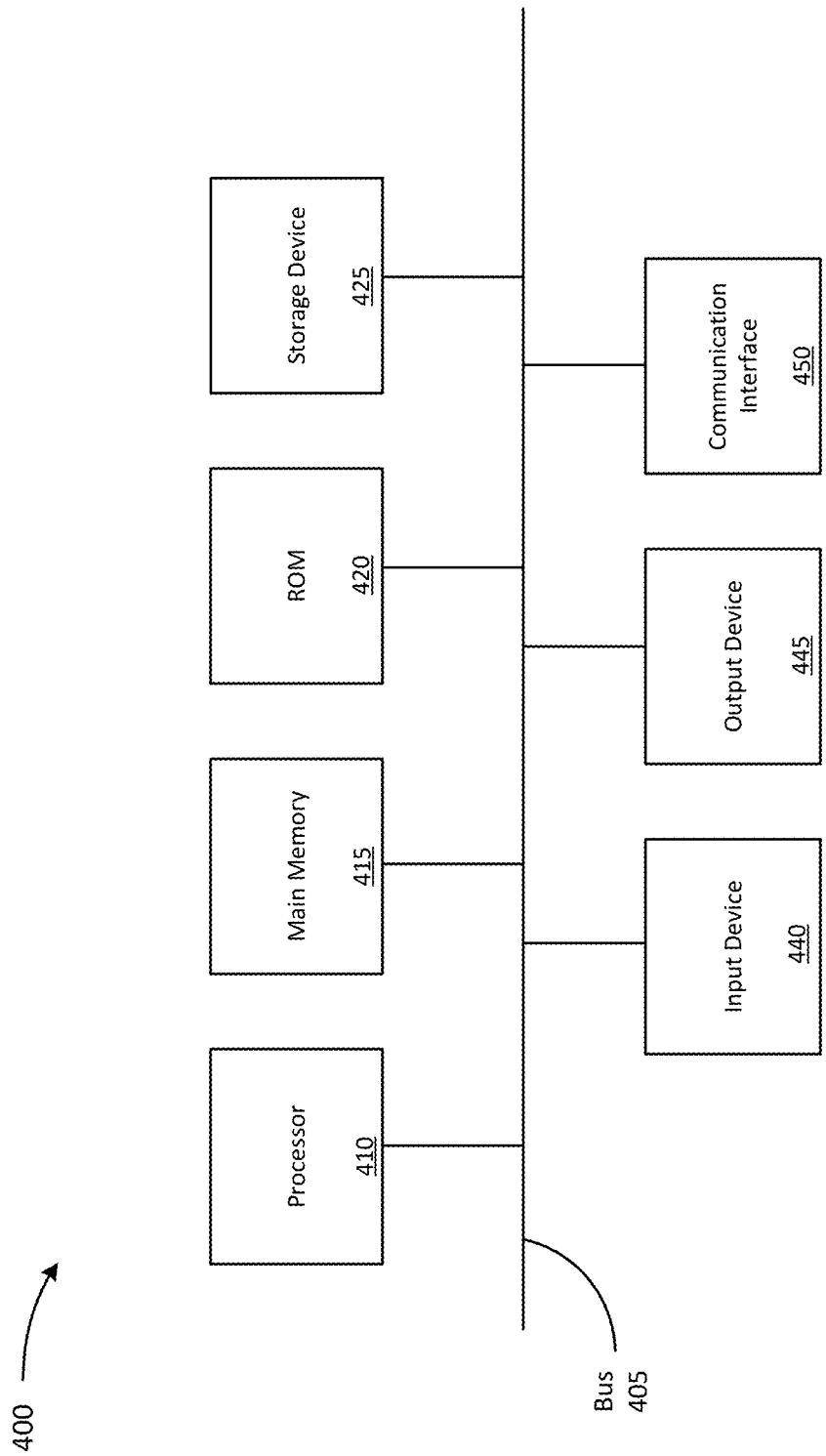

IDENTIFYING NETWORK COMMUNICATION PERFORMANCE OUTLIER ENDPOINTS IN A COMPUTER NETWORK

CROSS-REFERENCE TO RELATED APPLICATIONS

This application claims the benefit of and priority to U.S. Provisional Patent Application 62/949,508, which was filed on Dec. 18, 2019, and is incorporated herein by reference in its entirety.

BACKGROUND

A computer network is a digital telecommunications network which allows nodes or endpoints (e.g., computing devices) to communicate and/or share resources. In computer networks, computing devices (e.g., desktop computers, servers, laptops, tablets, mobile devices, network devices, etc.) exchange data with each other using connections (data links) between nodes. These data links are established over cable media such as wires or optic cables, or wireless media.

A "sub-network" (or "subnet") may include a subset of interconnected endpoints nested within a higher-level network. Subnets may be created for endpoints having common features, functions, applications, services, etc., or that are associated with a common organization, company, etc. Subnets may be co-located (e.g., within a common geographic location, data center, facility, etc.), but may also be distributed across different locations. A local area network (LAN) is a computer network that interconnects computers within a limited area such as a residence, school, laboratory, university or business campus, office building, data center, etc. By contrast, a wide area network (WAN) not only covers a larger geographic distance, but also generally involves leased telecommunication circuits. Some computer networks may be relatively complex and include multiple different layers, subnets, LANs, and WANs, between one node and another.

In network engineering and planning, network communication metrics may be acquired through different types of testing procedures. Network communication performance metrics between two endpoints may include a measure of bandwidth, latency, jitter, or the like. In general, network communication performance between two endpoints is relatively higher the more direct the connection between the two endpoints, although other factors may impact the level of communication performance (e.g., network interface hardware limitations, network communication policies, network security policies, etc.). Thus, endpoints that are co-located may typically experience higher network performance than endpoints that are not co-located.

SUMMARY

In an example aspect, a computer-implemented method includes selecting, by a host endpoint device within a subnet, a test endpoint device, of a plurality of test endpoint devices within the subnet, with which to perform a connectivity performance quality test; determining, by the host endpoint device, a payload size for a test file to be used for performing a network throughput test as part of the connectivity performance quality test; performing, by the host endpoint device, the connectivity performance quality test with the test endpoint device, wherein performing the connectivity performance quality test comprises performing a plurality of network throughput tests using the test file having the payload size that was determined; and providing, by the host endpoint device, results data from the connectivity performance quality test to a central network administration device, whereby the central network administration device executes a computer-based instruction based on the results data from the connectivity performance quality test.

In another example aspect, a computer program product includes a computer readable storage medium having program instructions embodied therewith. The program instructions are executable by a host endpoint computing device within a subnet to cause the host endpoint computing device to perform operations including: executing a plurality of individual connectivity performance quality tests with a plurality of test endpoint devices within the subnet to produce a plurality of sets of results data; providing, by the host endpoint computing device, the plurality of sets of results data from the connectivity performance quality tests to a central network administration device, whereby the central network administration device executes a computer-based instruction based on the plurality of sets of results data from the connectivity performance quality tests In another example aspect, a system includes: a computer readable memory device including program instructions; a processor, operably connected to the computer readable memory device, configured to execute the program instructions to perform operations including: selecting, by a host endpoint device within a subnet, a test endpoint device, of a plurality of test endpoint devices within the subnet, with which to perform a connectivity performance quality test; determining, by the host endpoint device, a payload size for a test file to be used for performing a network throughput test as part of the connectivity performance quality test; performing, by the host endpoint device, the connectivity performance quality test with the test endpoint device, wherein performing the connectivity performance quality test comprises performing a plurality of network throughput tests using the test file having the payload size that was determined; and providing, by the host endpoint device, results data from the connectivity performance quality test to a central network administration device, whereby the central network administration device executes a computer-based instruction based on the results data from the connectivity performance quality test.

BRIEF DESCRIPTION OF THE DRAWINGS

FIG. 4 illustrates example components of a device that may be used within environment of FIG. 1.

DETAILED DESCRIPTION

Figure 1:
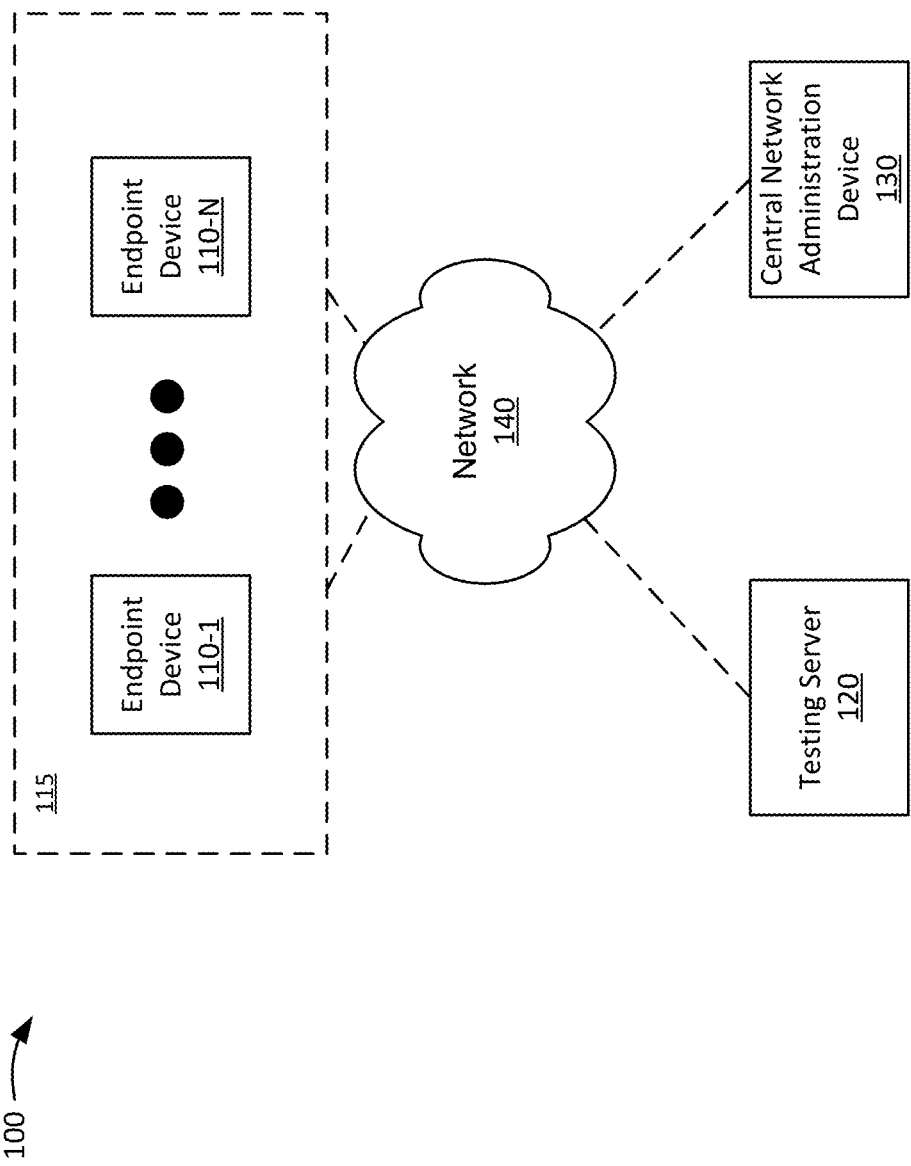
FIG. 1 shows an example environment and overview of an example implementation in accordance with aspects of the present disclosure.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

A "sub-network" (or "subnet") may include endpoints (e.g., network nodes, computing devices, network devices, etc.) associated with a common organization, facility, function, service, or the like. For example, a subnet may include endpoints associated with a service center that provides a particular type of service for a particular group of customers. The endpoints in a subnet may be co-located, but may also be distributed across various geographic locations. For example, some host endpoints may be configured as local network peers within a subnet even when those host endpoints are not co-located (e.g., when the endpoints access the subnet through a WAN, a Virtual Private Network (VPN), etc.). As such, network communication performance between endpoints is not uniform across a subnet, as co-located endpoints may experience better performance than endpoints that are not co-located. Also, connectivity performance between different endpoints in a subnet and endpoints outside of the subnet may not be uniform. Consequently, workloads, data packets, and/or other network communications may be slowed when those communications and workloads are routed or transmitted through endpoints having poor connectivity to other endpoints within the subnet.

Accordingly, aspects of the present disclosure may identify "outlier" endpoints (e.g., endpoints having poor connectivity) by determining connectivity performance quality between the peer-to-peer endpoints in a subnet. As described herein, the connectivity performance quality (also referred to herein as "connectivity quality") may be quantified or determined based on one or more connectivity performance metrics (e.g., roundtrip latency, bandwidth rates, jitter, etc.). The connectivity performance quality may be determined based on a series of connectivity tests that calculate, measure, or determine the connectivity performance metrics between two endpoints. In some embodiments, the outlier endpoints may include those endpoints having connectivity performance quality below a particular threshold as determined by the connectivity tests. Additionally, or alternatively, aspects of the present disclosure may calculate or identify connectivity scores or a measure of connectivity performance quality of each endpoint in a subnet, and may visually present the endpoint connectivity performance quality (e.g., in a network map, a table, chart, or the like displayed on a monitor or screen). As described herein, the information identifying endpoint outliers may be used to change and/or improve the technical operation of a network. For example, the information identifying endpoint outliers may be used to modify network topology, modify network processes, modify network policies (e.g., security policies, Quality of Service (QoS) policies, etc.), modify communications paths, update network hardware, move network equipment, or perform some other network planning-related task to mitigate, repair, circumvent, or otherwise mitigate the adverse effects of the outlier endpoints. Further, aspects of the present disclosure may not only measure, identify, or determine performance quality among peers in a subnet, but may also measure, identify, or determine the connectivity performance between endpoints in a subnet and endpoints outside of the subnet. In this way, connectivity between the subnet and other external networks may be evaluated, and lower performing endpoints may be mitigated by changing or modifying the network to reduce or avoid usage of the lower performing, outlier endpoints.

In some embodiments, each endpoint may execute its own connectivity tests to identify, determine, or measure its connectivity performance quality with other endpoints in a subnet. More specifically, each endpoint may maintain a peer client list identifying other endpoints in the same subnet, and may execute connectivity tests with respect to each endpoint on the list. As described herein, an endpoint may self-identify itself as an outlier when a measure of the endpoint's connectivity performance quality with other endpoints is lower than a threshold level, which may be predetermined or may be calculated based on the connectivity performance quality between other nodes in the network (e.g., based on the average, the median, or a percentile of the connectivity performance quality measurement for all the other node connections in the network). For example, if a target endpoint's self-measured connectivity performance quality with other endpoints in the subnet is lower than a threshold level (e.g., has relatively low bandwidth, throughput, latency, jitter, etc.), the target endpoint may self-identify as an outlier. In some embodiments, each endpoint may store information identifying or representing its connectivity performance quality with other endpoints in a subnet.

In some embodiments, testing policies may be implemented to prevent inaccurate testing, and/or to prevent connectivity testing from adversely impacting normal operational communications between the endpoints. For example, bandwidth limits, QoS policies, and/or other policies may be implemented for connectivity testing such that bandwidth and/or other network resources are not unrestrictedly consumed for connectivity testing, which could adversely affect endpoint communications for normal operations. In such embodiments, connectivity performance quality may be measured with consideration and adjustments to compensate for these policies. As an example, if a bandwidth speed test result or measurement between two endpoints is 10 megabits per second (Mbps), and the two endpoints have a capability to transfer data at 1000 Mbps, the connectivity performance quality may not necessarily be considered to be poor if a testing policy was implemented to limit bandwidth to 10 Mbps during the connectivity testing. On the other hand, if a bandwidth speed test result between two endpoints is 10 Mbps, the two endpoints have a capability to transfer data at 1000 Mbps, and the testing policy permitted or set a bandwidth limit of 100 Mbps, then the connective performance quality may be considered to be relatively low, substandard, or inferior. Similar examples may apply for other connectivity performance metrics, such as latency and jitter. In general, connectivity performance may be measured with consideration or compensation for network policies, endpoint capabilities, hardware configurations, and/or software configurations.

In various implementations, the testing, and the measurements taken during testing, may be customized or dynamically altered in order to obtain more accurate connectivity performance quality test results. For example, in embodiments where payload test files are transferred between endpoints as part of connectivity testing, the minimum size of the payload test file may be set such that the transfer between the endpoints lasts for at least a desired amount of time, which may be considered a minimum or threshold duration (e.g., 10 seconds). In some embodiments, a series of preliminary measurements may be taken to determine the minimum size of the payload for actual testing. For example, to determine the minimum size of the payload test file that may be used to test connectivity between two endpoints for the desired threshold duration (e.g., for at least 10 seconds), the size of the test payload file may be iteratively or progressively increased after each preliminary transfer until a size is reached that requires at least the threshold duration amount of time (e.g., 10 seconds) to complete. Subsequently, connectivity performance quality tests may be executed between endpoints using a payload test file of the determined size, and thus the transfer size of a payload test file will be of the smallest size feasible that is still sufficiently large enough for the testing to last for a sufficient duration to get accurate results. Additionally, or alternatively, multiple concurrent connectivity tests with a single endpoint may be prevented, as conducting multiple concurrent connectivity tests would result in inaccurate test results (e.g., slower test file transfer speeds, higher latency, etc.).

As described herein, information identifying outlier endpoints and/or outlier connectivity performance quality between endpoints may be disseminated using a variety of techniques. For example, centralized network management systems may retrieve the connectivity performance quality information from each endpoint and generate an assessment report of the connectivity performance quality information. Further, the information from the connectivity performance quality information may be stored in a central database (e.g., once retrieved by the centralized network management systems). As the database is populated over a period of time, the connectivity performance quality information (e.g., roundtrip latency measurements, bandwidth measurements, etc.) may be used to assign each endpoint to dynamic computer groups, which represent and are organized according to ranges of connectivity performance (e.g., a set of endpoint(s) having bandwidth measurements from 0-10 Mbps, a set of endpoint(s) having bandwidth measurements from 10.1-20 Mbps, etc.). After grouping, the network may then be controlled or reconfigured such that transmission speeds for data to each endpoint are rate limited to specific maximum speeds according to the computer group association for each endpoint, thereby preventing network capability overrun. Further, detailed analysis of the complete data records may identify subnets having endpoints reporting significantly different bandwidth or latency for peer-to-peer communications. This information may be leveraged to enable and direct network infrastructure reconfiguration to separate endpoints into discrete subnets where appropriate (e.g., according to maximum bandwidth capability) and identify where the network infrastructure requires capability upgrades to resolve performance problems.

As described herein, the systems and/or methods may be used to determine connectivity performance quality between or for endpoints in a network, and identify outlier endpoints (e.g., endpoints having performance measurements or calculation results that are significantly different (e.g., larger or smaller) than those of other endpoints). In various embodiments, the information identifying outliers is used to improve the technical functioning of the network by improving communications between endpoints, for example, by adjusting loads, usage, hardware, etc. and thus, to improve the speed and performance of applications served by the endpoints. In this way, the technical performance of the computer network is improved. Further, in various embodiments, computer and network resources are allocated or reallocated to technically improve the network and make it more efficiently by using the endpoint outlier information to modify the topology of the network, modify network processes, modify network policies (e.g., security policies, QoS policies, etc.), update network hardware, move network equipment, or perform some other network planning-related task to mitigate, repair, circumvent, optimally use the capabilities of, or otherwise address the outlier endpoints.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 shows an example environment and overview of an example implementation in accordance with aspects of the present disclosure. As shown in FIG. 1, environment 100 includes multiple end point devices 110, a subnet 115, a testing server 120, a central network administration device 130, and a network 140. In embodiments, one or more components in the environment 100 may correspond to one or more components in a cloud computing environment. In embodiments, one or more components in environment 100 may be or include the components of computer system and/or a server.

In various implementations, the end point devices 110 may be or include computing devices (e.g., user devices, desktop computing devices, portable computing devices, mobile computing devices, server devices, network devices, or the like). As shown in FIG. 1, the end point devices 110 may communicate with each other within the subnet 115. For example, the end point devices 110 may be computing devices, for example peer-to-peer devices, connected within a LAN and may be co-located. Additionally, or alternatively, one or more of the end point device 110 may not be co-located, and may access the subnet 115 via the network 140, a VPN, or the like.

The subnet 115 may be a local network or subdivided network or a defined portion of a larger network, or the like, which is composed of multiple end point devices 110, which may be peer-to-peer devices as noted. In some embodiments, the subnet 115 may be a LAN and/or may be formed using a VPN. One or more of the end point devices 110 within the subnet 115 may be co-located and may directly communicate through a LAN. Additionally, or alternatively, one or more of the end point devices 110 may be geographically distributed (e.g., located a significant distance from other devices) and may access the subnet 115 via the network 140, a VPN, or the like. As such, the connectivity quality between some pairs of end point devices 110 may be significantly higher than the connectivity quality between other pairs of end point devices 110. In some embodiments, the subnet 115 may include network devices and/or a combination of devices for connecting the end point devices 110, such as routers, switches, and the like. In some embodiments, the subnet 115 may be associated with a specific organization, group, company, or the like, and may implement security policies, firewalls, etc. for securing the communications within the subnet 115.

In the example shown, the testing server 120 may be or include one or more server located and/or connected outside of the subnet 115. In some embodiments, the testing server 120 may be used to test, measure or determine connectivity performance quality between one or more of the end point devices 110 within the subnet 115 and a device (e.g., the testing server 120) of an outside network (e.g., the network 140). As described herein, a subset of the end point devices 110 may communicate with the testing server 120 to test connectivity performance quality, to verify that the subnet 115 has connectivity to the network 140, and to measure or determine the quality of the connection between the subnet 115 and the network 140.

The central network administration device 130 may include one or more server or other computing device that manages the configuration of the subnet 115. In various embodiments, the central network administration device 130 may be located and/or connected within or outside of the subnet 115. In some embodiments, the central network administration device 130 may store and/or manage the topology of the subnet 115, and may also store, control, and/or manage the configuration, operation, routing protocols, routing paths, security policies, network policies, etc. associated with the subnet 115. In some embodiments, the central network administration device 130 may obtain connectivity quality information/data, (for example, results data from connectivity performance quality tests) that is provided from the end point devices 110, and may use it to identify or determine the end point devices 110 (if any) that exhibit or have outlier performances, such as one or more underperforming connection quality compared to an expected performance or to the performance of other end point devices 110. In various embodiments, the central network administration device 130 may execute computer code or instructions to modify network topology, network paths, security policies, network policies, QoS policies, or perform other operations to improve the technical operation of the subnet 115, based on the connectivity quality information or data obtained from one or more end point device 110. In some embodiments, this may be initiated by a network administrator using the central network administration device 130. As one illustrative example, as described herein, the central network administration device 130 may execute code that modifies a communications path such that certain applications and services provided by the endpoints 110 are rerouted differently as to avoid or circumvent one or more outlier endpoints 110.

The network 140 may be or include multiple network nodes, such as the testing server 120, the central network administration device 130, and the endpoint devices 110-1 . . . 110-N, (where N is an integer greater than 1) and other nodes (not shown). Additionally, or alternatively, the network 140 may be or include one or more wired and/or wireless networks. For example, the network 140 may include a cellular network (e.g., a second generation (1G) network, a third generation (3G) network, a fourth generation (4G) network, a fifth generation (1G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 140 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 140 may include copper transmission cables, optical transmission fibers, wireless transmission, routers, firewalls, switches, gateway computers and/or edge servers.

The quantity of devices and/or networks in the environment 100 is not limited to what is shown in FIG. 1. In practice, the environment 100 may include additional devices and/or networks; fewer devices and/or networks; different devices and/or networks; or differently arranged devices and/or networks than illustrated in FIG. 1. Also, in some implementations, one or more of the devices of the environment 100 may perform one or more functions described as being performed by another one or more of the devices of the environment 100. Devices of the environment 100 may interconnect via wired connections, wireless connections, or a combination of wired and wireless connections.

Figure 2:
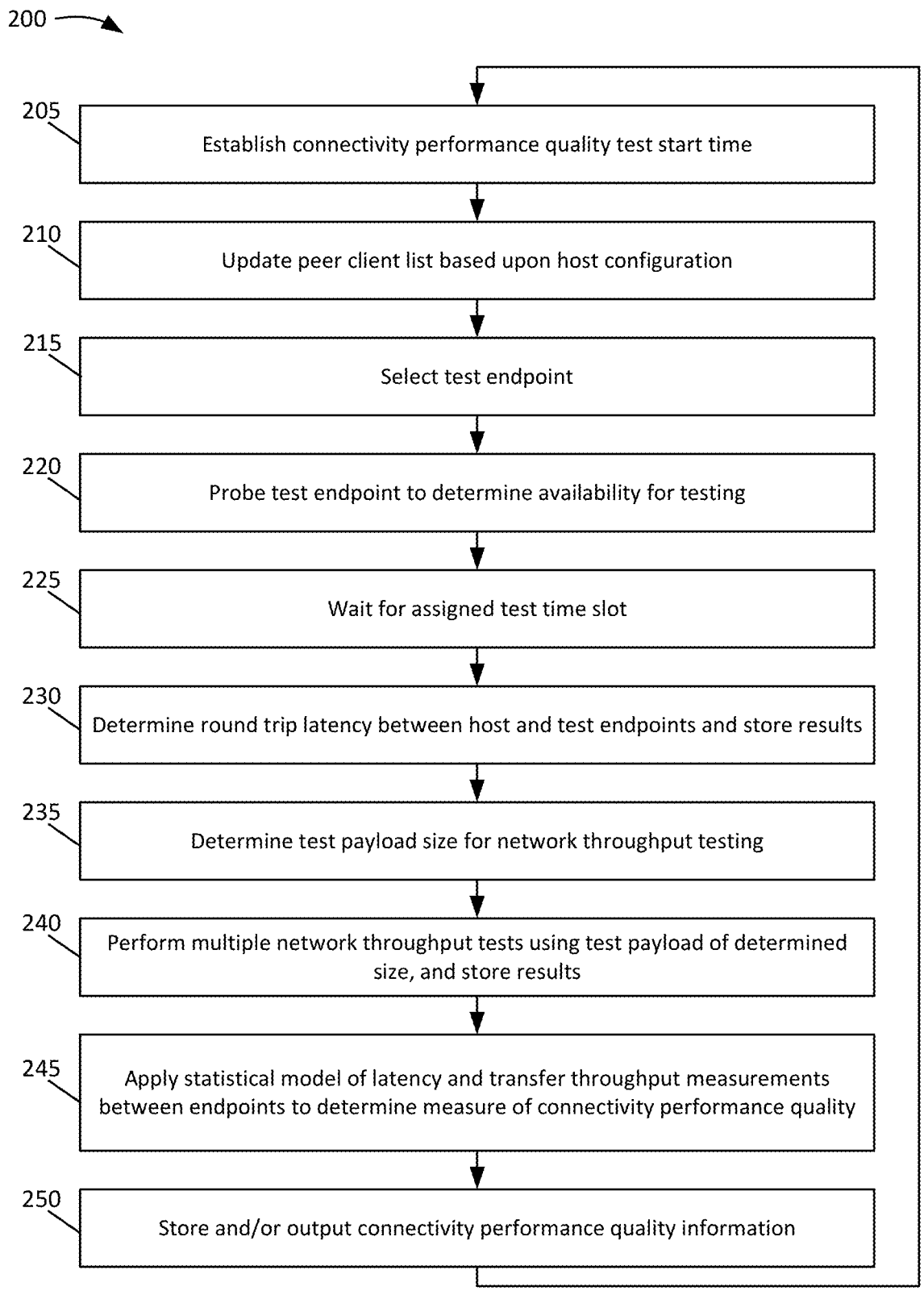
FIG. 2 shows an example flowchart of a process for determining an endpoint's connectivity performance quality with other endpoints in a subnet.

FIG. 2 shows an example flowchart of a process for determining an endpoint's connectivity performance quality with other endpoints in a subnet. The steps of FIG. 2 may be implemented in the environment of FIG. 1, for example, and are described using reference numbers of elements depicted in FIG. 1. As noted above, the flowchart illustrates the architecture, functionality, and operation of possible implementations of systems, methods, and computer program products according to various embodiments of the present disclosure. As described herein, process 200, described herein, may be performed by each endpoint 110 in the subnet 115.

As shown in FIG. 2, process 200 may include establishing a connectivity performance quality test start time (step 205). For example, the end point device 110 (e.g., a host end point device 110) may establish a time to perform a connectivity performance quality test with another end point device 110 (e.g., a client end point device 110) in the subnet 115. In some embodiments, the host end point device 110 may set the connectivity performance quality test start time to a random value. In this way, the connectivity start test start times among all end point devices 110 in the subnet 115 may be distributed so as to prevent multiple connectivity performance quality tests from being scheduled at the same time with a given end point device 110.

Process 200 also may include updating a peer client list based on a host configuration (step 210). For example, the host end point device 110 may update a peer client list identifying the other endpoints 110 that are connected within the subnet 115. In some embodiments, the host configuration may be received from the central network administration device 130, via a client discovery process, and/or from another source or technique.

Process 200 further may include selecting a test endpoint (step 215). For example, the host end point device 110 may select a particular test endpoint 110 (e.g., from among the endpoints 110 identified in the peer client list) with which to perform a connectivity performance quality test. In some embodiments, the host end point device 110 may select the test endpoint 110 randomly, via a round-robin technique, or the like. Additionally, or alternatively, the host end point device 110 may select the test endpoint 110 if a connectivity performance quality test has not previously been performed with the test endpoint 110. Additionally, or alternatively, the host end point device 110 may select the test endpoint 110 having the most outdated connectivity performance quality test.

Process 200 also may include proving the test endpoint to determine its availability for testing (step 220). For example, the end point device 110 may probe the test endpoint 110 to determine whether the test endpoint 110 is available for connectivity performance quality testing. In some embodiments, the test end point device 110 may determine whether it is available based on whether or not the test end point device 110 is currently performing a connectivity performance quality test with a different end point device 110 (e.g., if a testing application, process, or port/channel reserved for testing is in use). In some embodiments, the test end point device 110 may provide an indication to the host end point device 110 as to whether the test end point device 110 is available for testing, and if not, a time slot as to when the test end point device 110 is available to be tested. For example, the test end point device 110 may maintain a queue of other end point devices 110 with which it is scheduled to perform connectivity tests.

Process 200 further may include waiting for the assigned test time slot (step 225). For example, the host end point device 110 may wait (e.g., perform no testing action) with the test end point device 110 until the assigned time slot. In some embodiments, step 220 may be omitted if the test end point device 110 is immediately available for testing. Additionally, or alternatively, the host end point device 110 may continue with process 200 to perform a connectivity performance quality test with a different test end point device 110 while waiting for the assigned time slot.

Process 200 also may include determining round trip latency between the host and test endpoints and storing the results (step 230). For example, when the test end point device 110 is available, the host end point device 110 may begin the connectivity performance quality test by performing a round trip latency test with the test end point device 110. In some embodiments, the host end point device 110 may perform a round trip latency test using any suitable latency testing technique. For example, the host end point device 110 may exchange a relatively small test payload file (e.g., approximately 1 kilobit in size), and repeat the exchange for several iterations (e.g., twenty iterations or other number of iterations). In some embodiments, the duration of time for each transfer may be recorded (e.g., in milliseconds) and stored.

Process 200 further may include determining a test payload size for network throughput testing (step 235). For example, the host end point device 110 may determine a test payload size to use to test network throughput between the host end point device 110 and the test end point device 110 as part of the connectivity performance quality test. As the network throughput between the host end point device 110 and the test end point device 110 may be unknown at this time, it may be potentially problematic for a relatively large-sized payload to be used for throughput testing, as a large-sized payload may take an inordinate amount of time to transfer. Accordingly, the host end point device 110 may begin throughput testing by using relatively small-sized payload files (e.g., in the event the throughput between the host end point device 110 and the test end point device 110 is relatively low). However, too small of payload test file may result in the network throughput test being completed within too short of a duration. That is, the network throughput test should have a sufficiently long duration to achieve accurate network throughput test results (e.g., ten seconds to twenty seconds). Thus, the host end point device 110 may iteratively or progressively select increasing sizes of the payload test file after each transfer until the network throughput test duration is within a predetermined range (e.g., the ten second to twenty second range, or other range). Alternatively, if the payload test file is too large (e.g., the transfer of the payload test file is longer than the predetermined range), the host end point device 110 may select iteratively select smaller payload test files to use for testing until the network throughput test duration is within the predetermined range.

Process 200 also may include performing multiple network throughput tests using test payload of determined size, and storing results (step 240). For example, the host end point device 110 may perform multiple network throughput tests with the test end point device 110 using the test payload of the determined size as part of the connectivity performance quality test. More specifically, the host end point device 110 may initiate several transfers of the test payload having the determined size (e.g., determined at step 235). In some embodiments, the test payload may be transferred approximately five to ten times, although any number of transfers may be configured to obtain a reliable measurement of the transfer times. In embodiments, the transfer time for each transfer may be recorded (e.g., in milliseconds) and stored. As described herein, the transfer time and the payload size may be used to determine the network throughput between the host end point device 110 and the test end point device 110.

Process 200 further may include applying a statistical model to the latency and transfer throughput measurements between endpoints to determine measure of connectivity performance quality (step 245). For example, the host end point device 110 may apply one or more statistical models, functions, or the like to the latency and transfer throughput measurements with the test end point device 110 (e.g., as obtained, recorded, and stored at blocks 230 and 240, described herein). In some embodiments, the end point device 110 may apply any suitable statistical models with the latency and transfer throughput measurements between the host endpoint 110 and the test endpoint 110 as inputs to the statistical model. The statistical model may be used to derive a statistical inference of the connectivity performance quality between the host end point device 110 and the test end point device 110. In some embodiments, the connectivity performance quality may be represented in the form of one or more statistical parameters, such as a mean value of latency and throughput measurements, standard deviations, distributions, or the like. The performance quality connectivity may be standardized and/or scored against a scale in which a standardized score represents the level of quality. For example, a standardized score between 0-100 may be determined in which higher values are considered to represent higher levels of connectivity performance quality (e.g., higher values of throughput measurements, lower latency values, lower jitter values, etc.).

Process 200 also may include storing and/or outputting connectivity performance quality information (step 250). For example, the host end point device 110 may store results data of the connectivity performance quality test (e.g., the latency measurements, transfer throughput measurements, and connectivity performance quality values with the test end point device 110) in a data structure. In some embodiments, the information in the data structure may be retrieved by any source (e.g., the central network administration device 130). Additionally, or alternatively, the host end point device 110 may output or provide the information in the data structure to the central network administration device 130 (or another source). More specifically, the host end point device 110 may provide results data (e.g., latency measurements, transfer throughput measurements, and connectivity performance quality values) to the central network administration device 130 (or another source). In some embodiments, the central network administration device 130 may execute a computer-based instruction based on the results data. For example, the central network administration device 130 may generate a table or network map visually presenting the connectivity performance quality test results between one or more end point devices 110 and/or the end point devices 110 and the testing server 120. In some embodiments, the central network administration device 130 may execute an instruction (e.g., automatically or based on user input) to modify one or more network processes, policies, routing tables, etc. to improve the performance of data communications between the end point devices 110

As described herein, process 200 may repeat to individually test the performance quality connectivity between the host end point device 110 and other test end point devices 110 within the subnet 115. Thus, the host end point device 110 may produce and store individual connectivity performance quality values for each connection between the host end point device 110 and individual test end point device 110 within the subnet 115. For example, the host end point device 110 may maintain a data structure that identifies its latency measurements, transfer throughput measurements, and connectivity performance quality values with other test end point devices 110 within the subnet 115. The host end point device 110 may self-identify whether it is an "outlier" (e.g., if the connectivity performance quality is less than a threshold between more than a threshold number of test end point devices 110 within the subnet 115).

In some embodiments, process 200 may be performed by additional end point devices 110 within the subnet 115. For example, an end point device 110 that is a host end point device 110 at one point in time may also be a test end point device 110 at another point in time, and vice versa. In this way, multiple different end point devices 110 within the subnet 115 may store information identifying its latency measurements, transfer throughput measurements, and connectivity performance quality values with other end point devices 110 within the subnet 115.

In some embodiments, the information stored by the end point devices 110 within the subnet 115 may be retrieved and aggregated (e.g., by the central network administration device 130) and the aggregated data may be used to obtain a high-level picture of the connectivity performance quality between the different end point devices 110 in the subnet 115. In some embodiments, the connectivity performance quality between the different end point devices 110 in the subnet 115 may be used to improve overall network performance, modify network topology, modify network processes, modify network policies (e.g., security policies, QoS policies, etc.), modify communications paths, update network hardware, move network equipment, or perform some other network planning-related task to mitigate, repair, circumvent, or otherwise mitigate the adverse effects of outlier endpoints 110.

In some embodiments, process 200 may be performed to test for connectivity between a host end point device 110 and a testing server 120 (e.g., an endpoint outside of the subnet 115). For example, at step 215, the end point device 110 may select the testing server 120 for testing instead of another end point device 110 within the subnet 115. In some embodiments, a select subset of end point devices 110 within the subnet 115 may perform testing with the subnet 115 (e.g., to verify connectivity between the subnet 115 and the network 140, and/or to test the connectivity performance quality with endpoints outside of the subnet 115).

In some embodiments, the central network administration device 130 may receive, retrieve, farm, or otherwise acquire or obtain the results of connectivity performance tests. Based on obtaining the results of the connectivity performance tests, the central network administration device 130 may execute a computer-based instruction. For example, the central network administration device 130 may generate a table or network map visually presenting the connectivity performance quality test results between one or more end point devices 110 and/or the end point devices 110 and the testing server 120. In some embodiments, the central network administration device 130 may execute an instruction (e.g., automatically or based on user input) to modify one or more network processes, policies, routing tables, etc. to improve the performance of data communications between the end point devices 110. As one example, the central network administration device 130 may execute an instruction (e.g., automatically or based on user input) to modify one or more network processes, policies, routing tables, etc. such that data flows circumvent outlier end point devices 110.

In some embodiments, multiple individual connectivity performance quality tests between the host endpoint device 110 and respective test endpoint devices 110 within the subnet 115. The results data from each of the individual connectivity performance quality tests may be stored, and/or provided to (or retrieved by) the central network administration device 130. The central network administration device may execute a computer-based instruction based on the results data from each of the plurality of individual connectivity performance quality tests.

Figure 3:
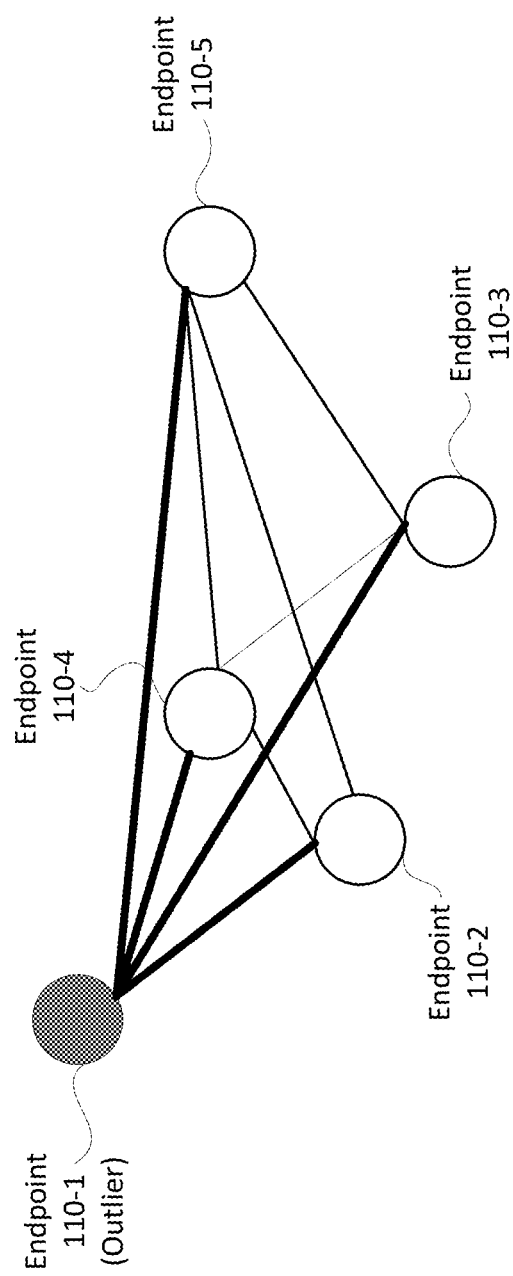
FIG. 3 illustrates an example visual representation of connection quality information between endpoints in a subnet.

FIG. 3 illustrates an example visual representation of connection quality information between endpoints in a subnet. As shown in FIG. 3, the endpoints 110-1 through 110-5 may be represented as nodes connected with connections between them. In the example of FIG. 3, the connection quality of the endpoints may be represented based on line thickness (e.g., in which thicker lines may represent poorer connection quality as to draw attention to these connections). Further, the endpoints 110 may be represented as icons with different levels of shadings, colors, etc. to represent their respective overall connection quality as an aggregate. For example, darker shades or different icon colors may represent lower aggregate connection quality with a larger number of endpoints 110. Additionally, or alternatively, weightings may be applied to determine the aggregate connection quality in which the connection quality with certain endpoints 110 is weighted higher than the connection quality with other endpoints 110.

In some embodiments, the visual representation shown in FIG. 3 may be displayed and presented to allow an operator to quickly and easily visually identify the connection quality between the endpoints 110 in a subnet 115. In this way, the outlier endpoints 110 may be quickly identified and mitigated accordingly. In some embodiments, the connection quality may be represented in some other format, such as a chart or data structure identifying endpoint pairs, and connection quality information between the pairs (e.g., round trip latency measurements, jitter measurements, bandwidth measurements, etc.).

FIG. 4 illustrates example components of a device 400 that may be used within environment 100 of FIG. 1. Device 400 may correspond to the end point devices 110, the testing server 120, and/or the central network administration device 130. Each of the end point devices 110, the testing server 120, and/or the central network administration device 130 may include one or more devices 400 and/or one or more components of device 400.

As shown in FIG. 4, device 400 may include a bus 405, a processor 410, a main memory 415, a read only memory (ROM) 420, a storage device 425, an input device 440, an output device 445, and a communication interface 450.

Bus 405 may include a path that permits communication among the components of device 400. Processor 410 may include a processor, a microprocessor, an application specific integrated circuit (ASIC), a field programmable gate array (FPGA), or another type of processor that interprets and executes instructions. Main memory 415 may include a random access memory (RAM) or another type of dynamic storage device that stores information or instructions for execution by processor 410. ROM 420 may include a ROM device or another type of static storage device that stores static information or instructions for use by processor 410.

Storage device 425 may include a magnetic storage medium, such as a hard disk drive, or a removable memory, or a flash memory.

Input device 440 may include a component that permits an operator to input information to device 400, such as a control button, a keyboard, a keypad, or another type of input device. Output device 445 may include a component that outputs information to the operator, such as a light emitting diode (LED), a display, or another type of output device. Communication interface 450 may include any transceiver-like component that enables device 400 to communicate with other devices or networks. In some implementations, communication interface 450 may include a wireless interface, a wired interface, or a combination of a wireless interface and a wired interface. In embodiments, communication interface 450 may receiver computer readable program instructions from a network and may forward the computer readable program instructions for storage in a computer readable storage medium (e.g., storage device 425).

Device 400 may perform certain operations, as described in detail below. Device 400 may perform these operations in response to processor 410 executing software instructions contained in a computer-readable medium, such as main memory 415. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 415 from another computer-readable medium, such as storage device 425, or from another device via communication interface 450. The software instructions contained in main memory 415 may direct processor 410 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 400 may include additional components, fewer components, different components, or differently arranged components than are shown in FIG. 4.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
    selecting, by a host endpoint device within a subnet, a test endpoint device, of a plurality of test endpoint devices within the subnet, with which to perform a connectivity performance quality test to identify outlier nodes;
    determining, by the host endpoint device, a payload size for a test file to be used for performing a network throughput test as part of the connectivity performance quality test;
    performing, by the host endpoint device, the connectivity performance quality test with the test endpoint device, wherein performing the connectivity performance quality test comprises performing a plurality of network throughput tests using the test file having the payload size that was determined; and
    providing, by the host endpoint device, results data from the connectivity performance quality test to a central network administration device, whereby the central network administration device executes a computer-based instruction based on the results data from the connectivity performance quality test,
    wherein the host endpoint device self-identifies as one of the outlier nodes based on determining when the connectivity performance quality between the host endpoint device and a threshold number of the test endpoint devices within the subnet is less than a threshold amount, and
    wherein the computer-based instruction comprises:
        generating a network map including a visual representation of the subnet including visual representations of the host endpoint device, the test endpoint device, and a subnet connection between the host endpoint device and the test endpoint device, the visual representation of the subnet connection between the host endpoint device and the test endpoint device being a visual representation of the results of the connectivity performance quality test;
        modifying one or more network processes;
        modifying one or more network policies;
        modifying one or more routing tables; and
        modifying one or more connection paths between endpoint devices within the subnet.

2. The method of claim 1, further comprising:
    executing a plurality of individual connectivity performance quality tests between the host endpoint device and a respective plurality of test endpoint devices within the subnet; and
    providing the results data from each of the plurality of individual connectivity performance quality tests to the central network administration device, whereby the central network administration device executes the computer-based instruction based on the results data from each of the plurality of individual connectivity performance quality tests.

3. The method of claim 1, further comprising determining round trip latency between the host endpoint device and the test endpoint device as part of the connectivity performance quality test.

4. The method of claim 1, further comprising determining jitter between the host endpoint device and the test endpoint device as part of the connectivity performance quality test.

5. The method of claim 1, wherein the determining the payload size comprises exchanging progressively larger test files with the test endpoint device until the time to transfer a test file is within a predetermined time duration range.

6. The method of claim 1, wherein the computer-based instruction further comprises:
    visually presenting said network map on a display device.

7. The method of claim 1, further comprising:
    establishing a start time to perform the connectivity performance quality test with the test endpoint device;
    probing the test endpoint device;
    receiving an indication as to whether the test endpoint device is currently available for testing;
    waiting for the start time;
    performing the connectivity performance quality test with the test endpoint device when the indication indicates that the test endpoint device is currently available for testing and when the start time is reached;

receiving information identifying a time when the test endpoint device is available for testing when the indication indicates that the test endpoint device is currently not available for testing; and performing the connectivity performance quality test with the test endpoint device at the time that was identified.

8. The method of claim 7, wherein the establishing the start time comprises randomizing the start time.

9. The method of claim 1, wherein the selecting the test endpoint device comprises selecting the test endpoint device from a peer client list.

10. The method of claim 1, further comprising:
performing a connectivity performance quality test on a test server outside of the subnet; and
providing, by the host endpoint device, second results data from the connectivity performance quality test to the central network administration device.

11. A computer program product comprising a computer readable storage medium having program instructions embodied therewith, the program instructions executable by a host endpoint computing device within a subnet to cause the host endpoint computing device to perform operations comprising:
executing a plurality of individual connectivity performance quality tests with a plurality of test endpoint devices within the subnet to produce a plurality of sets of results data and to identify outlier nodes;
providing, by the host endpoint computing device, the plurality of sets of results data from the connectivity performance quality tests to a central network administration device, whereby the central network administration device executes a computer-based instruction based on the plurality of sets of results data from the connectivity performance quality tests,
wherein the host endpoint device self-identifies as one of the outlier nodes based on determining when the connectivity performance quality between the host endpoint device and a threshold number of the test endpoint devices within the subnet is less than a threshold amount, and
wherein the computer-based instruction comprises:
generating a network map including a visual representation of the subnet including visual representations of the host endpoint computing device, the plurality of test endpoint devices, and a plurality of subnet connections between the host endpoint computing device and the plurality of test endpoint devices, the visual representation of the plurality of subnet connections between the host endpoint computing device and the plurality of test endpoint devices being a visual representation of the results of the connectivity performance quality test;
modifying one or more network processes;
modifying one or more network policies;
modifying one or more routing tables; or and
modifying one or more connection paths between endpoint devices within the subnet.

12. The computer program product of claim 11, wherein each connectivity performance quality test of the plurality of individual connectivity performance quality tests comprises determining a payload size for a test file to be used for performing a network throughput test with a particular test endpoint device as part of the connectivity performance quality test.

13. The computer program product of claim 12, wherein determining the payload size comprises exchanging progressively larger test files with the test endpoint device until the time to transfer a test file is within a predetermined time duration range.

14. The computer program product of claim 11, wherein executing a single connectivity performance quality test, of the plurality of individual connectivity performance quality tests, comprises determining round trip latency between the host endpoint computing device and a particular test endpoint device.

15. The computer program product of claim 11, wherein executing a single connectivity performance quality test, of the plurality of individual connectivity performance quality tests, comprises determining jitter between the host endpoint computing device and a particular test endpoint device.

16. The computer program product of claim 11, wherein the computer-based instruction further comprises:
visually presenting said network map on a display device.

17. The computer program product of claim 11, wherein executing a single connectivity performance quality test, of the plurality of individual connectivity performance quality tests comprises:
establishing a start time to perform the connectivity performance quality test with the test endpoint device;
probing the test endpoint device;
receiving an indication as to whether the test endpoint device is currently available for testing;
waiting for the start time;
performing the connectivity performance quality test with the test endpoint device when the indication indicates that the test endpoint device is currently available for testing and when the start time is reached;
receiving information identifying a time when the test endpoint device is available for testing when the indication indicates that the test endpoint device is currently not available for testing; and
performing the connectivity performance quality test with the test endpoint device at the time that was identified.

18. The computer program product of claim 17, wherein the establishing the start time comprises randomizing the start time.

19. A system comprising:
a computer readable memory device including program instructions;
a processor, operably connected to the computer readable memory device, configured to execute the program instructions to perform operations comprising:
selecting, by a host endpoint device within a subnet, a test endpoint device, of a plurality of test endpoint devices within the subnet, with which to perform a connectivity performance quality test to identify outlier nodes;
determining, by the host endpoint device, a payload size for a test file to be used for performing a network throughput test as part of the connectivity performance quality test;
performing, by the host endpoint device, the connectivity performance quality test with the test endpoint device, wherein performing the connectivity performance quality test comprises performing a plurality of network throughput tests using the test file having the payload size that was determined; and
providing, by the host endpoint device, results data from the connectivity performance quality test to a central network administration device, whereby the central network administration device executes a computer-based instruction based on the results data from the connectivity performance quality test, wherein the host endpoint device self-identifies as one of the outlier nodes based on determining when the connectivity performance quality between the host endpoint device and a threshold number of the test endpoint devices within the subnet is less than a threshold amount, wherein the computer-based instruction comprises:

generating a network map including a visual representation of the subnet including visual representations of the host endpoint device, the test endpoint device, and a subnet connection between the host endpoint device and the test endpoint device, the visual representation of the subnet connection between the host endpoint device and the test endpoint device being a visual representation of the results of the connectivity performance quality test;

modifying one or more network processes;
modifying one or more network policies;
modifying one or more routing tables; and
modifying one or more connection paths between endpoint devices within the subnet.

20. The system of claim 19, wherein the operations further comprise:

executing a plurality of individual connectivity performance quality tests between the host endpoint device and a respective plurality of test endpoint devices within the subnet; and providing the results data from each of the plurality of individual connectivity performance quality tests to the central network administration device, whereby the central network administration device executes the computer-based instruction based on the results data from each of the plurality of individual connectivity performance quality tests.

* * * * *